United States Patent [19]

Szabolcs et al.

[11] 4,107,409
[45] Aug. 15, 1978

[54] METHOD OF PRODUCING POLYMERS OF HIGH MOLECULAR WEIGHT BY THE TWO-PHASE INTERFACIAL METHOD

[75] Inventors: Otto Szabolcs; Hans Schüller, both of Vienna, Austria

[73] Assignee: Isovolta Osterreichische Isolierstoffwerke Aktiengesellschaft, Wiener Neudorf, Austria

[21] Appl. No.: 810,083

[22] Filed: Jun. 27, 1977

[30] Foreign Application Priority Data

Jun. 29, 1976 [AT] Austria ............................ 4764/76

[51] Int. Cl.² .............................................. C08F 2/00
[52] U.S. Cl. .................................. 526/65; 260/95 C; 526/88
[58] Field of Search ................. 260/95 C; 526/65, 88

[56] References Cited

U.S. PATENT DOCUMENTS

| | | | |
|---|---|---|---|
| 2,658,886 | 11/1953 | Swerdloff et al. | 260/95 C |
| 3,347,620 | 10/1967 | Yamashita | 526/65 |
| 3,674,740 | 7/1972 | Vernalken et al. | 260/95 C |
| 4,071,670 | 1/1978 | Vanzo et al. | 526/88 |

Primary Examiner—Alan Holler
Attorney, Agent, or Firm—Hammond & Littell

[57] ABSTRACT

A process for producing high molecular weight polymers by the two-phase interfacial method comprising bringing two liquid phases containing polymerizable reactants continuously into contact with one another in a predetermined quantitative ratio to one another and passing the resulting mixture through one mixing stage or a plurality of serially connected mixing stages, the mixture being divided into a plurality of partial streams in each mixing stage, and causing the partial streams together with their flow boundaries to move transversely to their main directions of flow at mean speeds higher than 5 meters per second and to pass into a mixing chamber which has at least one outlet duct and in which the kinetic energy of the mixture is reduced from the highest value attained in the mixing to a value which is low in relation to said highest value, the portions of the mixture flowing in the mixing chamber being subjected to flow conditions which substantially vary at least periodically.

5 Claims, 1 Drawing Figure

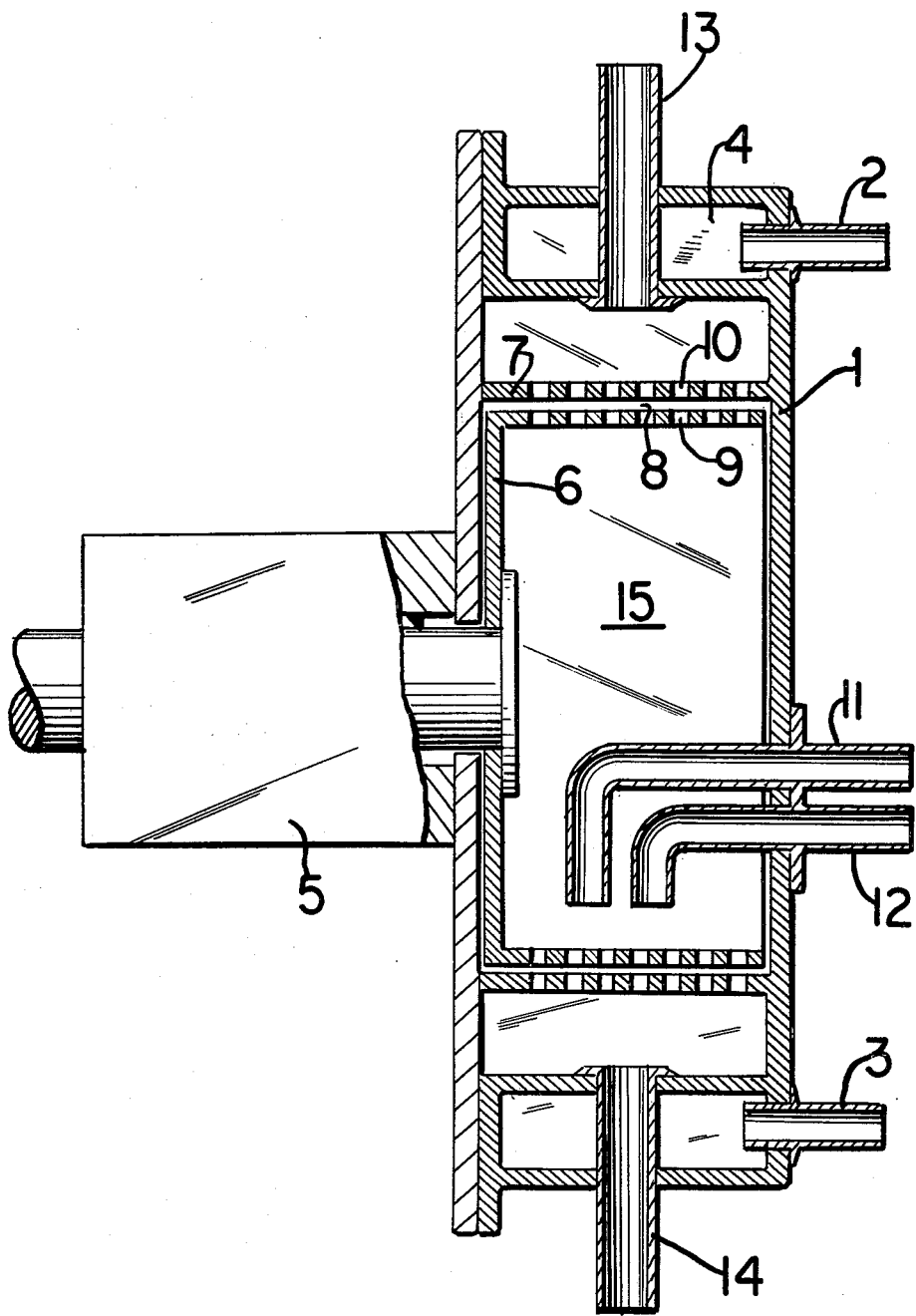

METHOD OF PRODUCING POLYMERS OF HIGH MOLECULAR WEIGHT BY THE TWO-PHASE INTERFACIAL METHOD

STATE OF THE ART

In the method of producing polymers of high molecular weight by the two-phase interfacial method, polymerization is effected by producing an intimate mixture of two immiscible liquid phases, each phase containing at least one of the reactants.

In a process of this type the speed of the polymerization process and the yield of high molecular weight polymers are usually increased by enlarging the active two-phase interface. In order to obtain the largest possible two-phase interface it is advantageous to produce a fine dispersion of one phase in the other. Dispersions of this kind, the formation of which is usually facilitated by adding emulsifiers, are usually produced discontinuously in stirrer vessels or else continuously in serially disposed batteries of stirrer vessels.

In all known processes of this kind a considerable time is required for the formation of dispersions from the two liquid phases which have been mixed with one another. During this time the two phases are in interfacial contact with one another and polymerization already begins to take place although the optimum conditions for polymerization have not yet been achieved.

In many kinds of synthesis of high molecular weight polymers, certain side-reactions can be completely suppressed only with difficulty. It is, however, a requirement for practicable synthesis that these side-reactions should take place substantially more slowly than the desired polymerization reaction. In order to achieve a high yield of high molecular weight polymers it is therefore advantageous to carry out the synthesis as quickly as possible and under optimum conditions.

OBJECTS OF THE INVENTION

It is an object of the invention to provide a process for the production of polymers of high molecular weight by the two-phase interfacial method, wherein after the two liquid phases containing the polymerizable reactants have been mixed the optimum state of a fine dispersion of one phase in the other is achieved very rapidly in the reaction vessel.

It is another object of the invention to provide a process for the production of high molecular weight polymers by two-phase interfacial polymerization comprising bringing two liquid phases containing polymerizable reactants continuously into contact with each other in a predetermined quantitative ratio and passing the resulting mixture through one mixing operation or a plurality of mixing operations in series, where the mixture of the two phases is divided into a plurality of streams in each mixing operation and said streams together with their flow boundaries flow at a high rate of speed into a mixing chamber with at least one outlet duct, in which mixing chamber the kinetic energy of the mixture is reduced from its previously attained highest value to a value which is low in relation to said highest value and the portions of the mixture flowing in the mixing chamber are subjected to flow conditions which substantially vary at least periodically.

It is a further object of the invention to provide a process for the production of high molecular weight polymers by two-phase interfacial polymerization comprising bringing two liquid phases containing polymerizable reactants continuously into contact with one another in a predetermined quantitative ratio and passing the resulting mixture through one mixing stage or a plurality of serially connected mixing stages, where the mixture is divided into a plurality of partial streams in each mixing stage and the partial streams together with their flow boundaries move transversely to their main directions of flow at mean speeds higher than 5 meters per second and pass into a mixing chamber having at least one outlet duct, in which mixing chamber the kinetic energy of the flowing mixture is reduced to a value which is low in relation to its previously attained highest value and the portions of the mixture flowing in the mixing chamber are subjected to flow conditions which substantially vary at least periodically.

These and other objects of the invention will become more apparent as the description thereof proceeds.

THE DRAWING

The drawing is a side vertical cross-sectional view of a reactor suitable for carrying out the process of the invention.

DESCRIPTION OF THE INVENTION

This invention is directed toward finding a method for the production of polymers of high molecular weight by the two-phase interfacial method, wherein after the two liquid phases have been mixed the optimum state of a fine dispersion of one phase in the other is achieved very rapidly in the reaction vessel. In the process according to the present invention, polymers of high molecular weight are produced by a two-phase interfacial method wherein for the purpose of effecting polymerization an intimate mixture of two immiscible liquid phases is produced, each phase containing at least one of the polymerizable reactants.

It has been found that high molecular weight polymers can be obtained in a two-phase interfacial method by bringing the two liquid phases continuously into contact with one another in a predetermined quantitative ratio and passing the resulting mixture through one mixing stage or a plurality of serially connected mixing stages, where the mixture of the two phases is divided into a plurality of streams in each mixing operation and said streams together with their flow boundaries flow at a high rate of speed into a mixing chamber with at least one outlet duct, in which mixing chamber the kinetic energy of the mixture is reduced from its previously attained highest value to a value which is low in relation to said highest value and the portions of the mixture flowing the mixing chamber are subjected to flow conditions which substantially vary at least periodically.

More particularly, the process of the invention for the production of polymers of high molecular weight by the two-phase interfacial method comprises bringing the two liquid phases continuously into contact with one another in a predetermined quantitative ratio to one another and passing the resulting mixture through one mixing stage or a plurality of serially connected mixing stages, said resulting mixture being thereby divided into a plurality of partial streams in each mixing stage, and causing said partial streams together with their flow boundaries to move transversely to their main directions of flow at high speeds and to pass into a mixing chamber which has at least one outlet duct, in which mixing chamber the kinetic energy of the mixture is reduced to a value which is low in relation to its previously attained highest value and the portions of the mixture flowing in said mixing chamber are subjected to flow conditions which substantially vary at least periodically.

According to an advantageous embodiment of the method of the invention the partial streams together with their flow boundaries, which are produced in the mixing of the two liquid phases, move transversely to their main directions of flow when passing into the mixing chamber at mean speeds higher than 5 meters per second, but more advantageously higher than 10 meters per second.

An embodiment of the present invention will now be more particularly described by way of example with reference to the figure of the accompanying drawing. The drawing shows a side cross-sectional view of a reactor suitable for carrying out the method of the invention.

In the cylindrical casing 1 of the reactor, which has a double jacket 4 provided with a liquid inlet 2 and liquid outlet 3, a hollow cylindrical rotor 6 open on one side is mounted for rotation in a bearing 5. In addition, the casing 1 contains a hollow cylindrical stator 7 which surrounds the rotor 6 and with the latter encloses a narrow annular gap 8 of a width of about 1 mm.

The rotor 6 and stator 7 are provided on their peripheries with a number of apertures 9 and 10, respectively. The apertures are advantageously uniformly distributed in a number of rows along the peripheries of the rotor and stator, so that in certain positions of the rotor each aperture 9 can be made to coincide or align with a corresponding aperture 10 of the stator 7. In the test reactor used in the following examples, 60 apertures were disposed one behind the other in a row along the periphery of both the rotor and stator.

On the entry face of the reactor casing 1 are provided two connection pipes 11, 12 whose open mouths project into the reactor antechamber 15 and advantageously end near the inner wall of the rotor 6. On its peripheral (outer) wall, preferably at points lying diametrically opposite one another, the reactor casing has additional connection pipes 13 and 14.

For the purpose of carrying out the process of the invention the rotor 6 is driven at a speed of, for example, 20,000 revolutions per minute, by a suitable driving means, such as a compressed air turbine, and the two liquid phases containing the reactants are fed by way of the two connection pipes 11 and 12, in a predetermined quantitative ratio to one another, with the aid of metering pumps, continuously to the reactor antechamber 15 formed by the interior of the hollow cylindrical rotor 6. The rotational speed of the rotor can naturally be varied within a fairly broad range, dictated by factors such as the capabilities of the mixing device and the desired characteristics in the polymer being synthesized. An example of a possible range is from 10,000 to 50,000 revolutions per minute. The range of from 20,000 to 40,000 revolutions per minute has been found to be especially advantageous. Through the shearing action of the moving inner wall of the rotor the two-phase liquid mixture in the antechamber 15 is rotated, whereby, intensified by the stirring effect caused by the connection pipes 11, 12 projecting into the antechamber 15, good mixing of the two phases is already effected at this stage of the process. Aided by the effect of the centrifugal forces which occur, the mixture formed in the antechamber 15 passes through the apertures 9 in the form of partial streams into the slit 8 bounded by the rotor 6 and stator 7, where the partial streams are subjected to a mixing process so that a fine dispersion of one phase in the other phase is formed, this dispersion then passing through the apertures 10 of the stator 7 into the annular space between the stator 7 and the casing wall 4. From this space the mixture is then discharged through the connecting pipe 14. The connecting pipe 13 can be sealed during the above process.

For cleaning purposes the reactor can be flushed out with a solvent through the connection pipes 13 and 14.

In order to keep the reaction mixture in the reactor at a predetermined temperature, a cooling or heating liquid is passed through the double jacket of the reactor vessel by way of the liquid inlet 2 and liquid outlet 3.

While the components of the reactor, such as the rotor and stator, can have various shapes, a circular mixing chamber defined by said rotor and stator has been found to be especially suitable. Thus, according to an advantageous embodiment of the method of the invention, the above-mentioned partial streams or flows move from the reactor antechamber into an annular mixing chamber, in which they move into their boundaries along a circular path along the periphery of the mixing chamber.

In a further advantageous embodiment of the process of the invention, a slit-shaped mixing chamber is used which has a mean width of less than 10 mm in the direction of each of the main directions of flow of the partial streams flowing from the reactor antechamber into the mixing chamber, which is advantageously circular.

During the movement of the partial streams together with their boundaries it is advantageous for each of the partial flow inlet apertures leading from the reactor antechamber to the mixing chamber 9, in their projection parallel to the respective main direction of the partial streams which flow onto the inlet apertures 10 of the mixing chamber outlet ducts, to be periodically brought at least partly into alignment or coincidence with the latter. Such alignment will occur periodically during the rotation of the rotor 6.

The following remarks are presented for help in understanding the mechanism occurring in the formation of the dispersion according to the process of the invention, without in any way restricting the invention to any particular theory.

The mean residence time of the mixture in the gap 8, determined in some test syntheses from the volume of the gap 8 and the throughput of mixture through the reactor, was in the range from 0.5 to 2 seconds.

Through the combined action of the rotor and stator the mixture within a very short time is accelerated to a relatively high speed and then decelerated, a turbulent flow necessarily having very small vortex regions occurring within the narrow gap 8. For example, with a rotor circumference of 30 cm and a rotor speed of 20,000 revolutions per minute a peripheral (outer circumference) speed of the rotor of 100 meters per second is obtained. The mixture is accelerated to this speed when it passes through the rotor apertures 9, whereupon the mixture is then decelerated during its passage through the gap 8 and finally, after passing through the stator apertures 10, is at this point at least reduced to a peripheral (outer boundary) speed which is very low in relation to the peripheral speed of the rotor. With a mean residence time of the mixture in the gap 8 of, for example, one second, the decelerations thus occurring may quantitatively amount to a multiple of gravitational acceleration.

During the braking of the liquid mixture in the gap 8, the stream of mixture is subjected to a rapidly changing variation of flow conditions. In fact, if with a peripheral speed of the rotor of, for example, 100 meters per second the mean peripheral speed of the mixture in the gap 5 is assumed to be 50 meters per second, a portion of mixture moving at this speed is subjected by the apertures 9 and 10 in the rotor 6 and stator 7, respectively, which move relative to it, to a periodic variation of flow conditions with a frequency of 10 kHz at the assumed rotor speed of 20,000 revolutions per minute.

In the reaction mixture, which is brought to a state of a fine dispersion of one phase in the other phase by the process of the invention, the polymerization reaction takes place and in many cases is already completed within a few seconds. In cases where the termination of the reaction can be recognized by a change of color of the reaction mixture, the main reaction time measured from the moment when the dispersion is formed until the end of the reaction can be determined in a particularly simple manner.

From the polymer-solvent mixture obtained in the manner described the polymer can be separated in the usual manner, as, for example, by means of centrifuging, washing, and drying. The remaining solvent mixture can be passed on to a recovery plant.

The invention also includes an apparatus for producing polymers of high molecular weight by the two-phase interfacial method which comprises: (1) a hollowed-out antechamber, having a cylindrical side wall and a bottom, equipped with two entry passages for introduction of the two liquid phases containing the polymerizable reactants, said antechamber (a) being mounted on a rotating means so that it is rotatable and (b) having apertures in its side wall; (2) a stationary cylindrical wall, exterior to said side wall of the antechamber, having apertures which can be periodically brought into alignment with the apertures of the side wall of the antechamber by rotation of the latter, a space being present between said antechamber side wall and said exterior wall which is narrow in relation to the space inside the hollowed-out antechamber; (3) an outer casing entirely enclosing the apparatus; and (4) two outlets, exterior to the cylindrical wall of (2) above and separated from it, said outlets being mounted in the outer casing and providing connection between the interior of the apparatus and its exterior.

The following examples are merely illustrative of the present invention without being deemed limitative in any manner thereof.

The degree of polymerization of the polymers produced by the methods described in the examples given below was determined by inherent viscosity (IV). This is given by the formula $$IV = (\ln \eta rel/C)$$

where $\eta$ rel represents relative viscosity and C the concentration of polymer in the solvent used in the measurement of viscosity.

For the viscosity measurements, which were made at 30° C, m-cresol was used as solvent and a polymer concentration of 0.5 gm/100 ml of solvent was employed.

EXAMPLES

The examples of polymer synthesis given below are examples of the process of the invention and comparative examples in which the same polymer was produced in each case by a conventional method. The inherent viscosities (IV) of the polymers obtained were determined. By the method of the invention it was in each case possible to obtain substantially higher viscosity values than by the conventional methods.

EXAMPLE 1A

Component A:

318 gm (1 mole) phenolphthalein
80 gm (2 moles) $N_aOH$
5.5 l water

Component B:

203 gm (1 mole) isophthaloyl dichloride
0.5 l 1,2-dichloroethane

These components A and B were continuously fed by means of metering pumps through the connecting pipes 11 and 12 to the reactor described in the drawing, the quantitative ratio of component A : component B by volume being 11 : 1, while the reactor rotor 6 was driven at a speed of 20,000 revolutions per minute. The mixture, which because of its alkaline phenol component A had a reddish color, becomes colorless on completion of the polymerization process. The delivery power of the metering pump is so controlled that the reaction mixture passing out of the connecting pipe 14 is colorless. The volume of mixture (volume of components A and B), which amounted to about 6 liters, was thus passed through the reactor in 5 minutes. The reactor, having a volume of about 100 ml, thus gave a residence time of the mixture in it of about 5 seconds.

The polymer formed was separated by centrifuging, washed free of chloride, and dried in vacuo. The organic solvent was recovered by simple separation.

The polymer yield of the synthesis amounted to 98%. Measured IV = 0.71.

EXAMPLE 1B

The components A and B mentioned above in Example 1A were reacted at 1500 revolutions per minute in a 10-liter flask provided with a propeller stirrer.

The reaction time was 40 minutes and the reaction mixture was processed as described in Example 1A.

The polymer yield was 93%; measured IV = 0.25.

EXAMPLE 2A

Component A:

318 gm (1 mole) phenolphthalein
80 gm (2 moles) $N_aOH$
5.5 l water

Component B:

203 gm (1 mole) isophthaloyl dichloride
0.5 l 1,2-dichloroethane

The reaction was carried out under the same conditions as in Example 1A, except that the rotor speed was increased to 40,000 revolutions per minute. The residence time of the mixture in the reactor was 3 seconds with the correspondingly increased throughput. The polymer yield was 99%; measured IV = 0.90.

EXAMPLE 2B

The components A and B mentioned above in Example 2A were reacted at 3000 revolutions per minute in a 10-liter flask provided with a propeller stirrer. The reaction time was 30 minutes and the reaction mixture was processed as described in Example 1A.

The polymer yield was 95%; measured IV = 0.39.

EXAMPLE 3A

Component A:

318 gm (1 mole) phenolphthalein
80 gm (2 moles) $N_aOH$
15 gm (0.1 mole) tetraethylammonium hydroxide (catalyst)
5.5 l water Component B:

203 gm (1 mole) isophthaloyl dichloride
0.5 l 1,2-dichloroethane

The reaction was carried out under the same conditions as in Example 2A, with the same residence time in the reactor of 3 seconds.

The polymer yield was 99%; measured IV = 0.92.

EXAMPLE 3B

The components A and B mentioned above in Example 3A were reacted at 3000 revolutions per minute in a 10-liter flask equipped with a propeller stirrer. The reaction time was 20 minutes and the reaction mixture was processed as described in Example 1A.

The polymer yield was 97%; measured IV = 0.48.

EXAMPLE 4A

Component A:

318 gm (1 mole) phenolphthalein
80 gm (2 moles) $N_aOH$
15 gm (0.1 mole) tetraethylammonium hydroxide (catalyst)
5.5 gm (1gm/l) non-ionic emulsifier
5.5 l water Component B:

203 gm (1 mole) isophthaloyl dichloride
0.5 l 1,2-dichloroethane

The reaction was carried out under the same conditions as in Example 3A, with the same residence time in the reactor of 3 seconds.

The polymer yield was 99%; measured IV = 0.91.

EXAMPLE 4B

The components A and B mentioned above in Example 4A were reacted at 3000 revolutions per minute in a 10-liter flask equipped with a propeller stirrer. The reaction time was 10 minutes and the reaction mixture was processed as described in Example 1A.

The polymer yield was 98%; measured IV = 0.52.

We claim:

1. A process of producing polymers of high molecular weight by the two-phase interfacial method, wherein for the purpose of effecting the polymerization an intimate mixture of two liquid phases which are not miscible with one another is formed, each phase containing at least one reactant, comprising bringing the two liquid phases into contact with one another in a predetermined quantitative ratio to one another and passing the resulting mixture through one mixing stage or a plurality of serially connected mixing stages, said resulting mixture being thereby divided into a plurality of partial streams in each mixing stage, and causing said partial streams together with their flow boundaries to move transversely to their main directions of flow at mean speeds higher than 5 meters per second from a reactor antechamber and to pass into a mixing chamber which has inlet apertures for passage of said streams and their flow boundaries and one or more outlet ducts, in which mixing chamber the kinetic energy of the mixture is reduced to a value which is low in relation to its previously attained highest value and the portions of the mixture flowing in said mixing chamber are subjected to flow conditions which substantially vary at least periodically.

2. The process according to claim 1 wherein the mean speeds of the movements, which are made transversely to the main directions of flow of the partial streams together with their boundaries, are higher than 10 meters per second.

3. The process according to claim 1, wherein the partial streams flow into an annular mixing chamber where, together with their boundaries, they move along a circular path along the periphery of the mixing chamber.

4. The process according to claim 1, wherein a slit-shaped mixing chamber is used which has a mean width of less than 10 mm in the direction of each of the main directions of flow of the partial stream flowing from the reaction antechamber into the mixing chamber.

5. The process according to claim 4, wherein during the movement of the partial streams together with their boundaries the partial stream inlet apertures of the mixing chamber, in their projection parallel to the respective main direction of the partial streams which flow into them are periodically brought at least partly into alignment with inlet apertures of the outlet ducts of the mixing chamber.

* * * * *